(12) United States Patent
Tada et al.

(10) Patent No.: US 10,604,871 B2
(45) Date of Patent: Mar. 31, 2020

(54) PROCESS FOR STEAM DRAWING CARBON-FIBER PRECURSOR ACRYLIC FIBER BUNDLE

(71) Applicant: Mitsubishi Chemical Corporation, Tokyo (JP)

(72) Inventors: Akishige Tada, Otake (JP); Yukihiro Mizutori, Otake (JP)

(73) Assignee: Mitsubishi Chemical Corporation, Tokyo (JP)

( * ) Notice: Subject to any disclaimer, the term of this patent is extended or adjusted under 35 U.S.C. 154(b) by 1135 days.

(21) Appl. No.: 14/900,459

(22) PCT Filed: Jun. 17, 2014

(86) PCT No.: PCT/JP2014/065995
§ 371 (c)(1),
(2) Date: Dec. 21, 2015

(87) PCT Pub. No.: WO2014/203880
PCT Pub. Date: Dec. 24, 2014

(65) Prior Publication Data
US 2016/0151959 A1   Jun. 2, 2016

(30) Foreign Application Priority Data
Jun. 21, 2013 (JP) .................. 2013-130970

(51) Int. Cl.
*D02J 1/22* (2006.01)
*B29C 55/00* (2006.01)
(Continued)

(52) U.S. Cl.
CPC ............ *D02J 1/222* (2013.01); *B29C 55/005* (2013.01); *D01D 11/02* (2013.01); *D01F 6/38* (2013.01);
(Continued)

(58) Field of Classification Search
None
See application file for complete search history.

(56) References Cited

U.S. PATENT DOCUMENTS 6,203,902 B1   3/2001   Ota et al.
9,388,516 B2 *  7/2016   Miyauchi ................. D02J 1/18

FOREIGN PATENT DOCUMENTS

CN   102061531 A   5/2011
JP   5-263313 A   10/1993
(Continued)

OTHER PUBLICATIONS

Machine translation JP 11-012874 A (google patents), 2019 (Year: 2019).*

(Continued)

*Primary Examiner* — Benjamin A Schiffman
(74) *Attorney, Agent, or Firm* — Oblon, McClelland, Maier & Neustadt, L.L.P.

(57) ABSTRACT

This process for manufacturing a carbon-fiber precursor acrylic fiber bundle and this steam drawing apparatus are characterized in that the drawing of an acrylic fiber bundle with a pressured-steam drawing apparatus is conducted by: opening an acrylic fiber bundle by blowing a fluid thereto; supplying humidifying steam to the opened acrylic fiber bundle at a fiber temperature of 80 to 130° C. to adjust the water content of the fiber bundle to 3 to 7%; and thereafter drawing the resulting acrylic fiber bundle in a pressurized-steam atmosphere. Thus, the present invention can prevent the breaking of a single fiber, the fluffing of the fiber bundle, and the breaking of the whole of the fiber bundle, though such defects are susceptible to occurring in a case where an acrylic fiber bundle is drawn by steam drawing at a high draw ratio, at a higher speed, or into a fiber having a small denier.

12 Claims, 4 Drawing Sheets

(51) Int. Cl.
| | |
|---|---|
| *D01F 6/38* | (2006.01) |
| *D01D 11/02* | (2006.01) |
| *D02J 1/18* | (2006.01) |
| *D01F 9/22* | (2006.01) |
| *D02J 13/00* | (2006.01) |
| *D01F 9/21* | (2006.01) |
| *D01F 6/18* | (2006.01) |
| *D06B 3/04* | (2006.01) |
| *D01D 5/16* | (2006.01) |
| *D06C 3/00* | (2006.01) |
| *B29K 33/00* | (2006.01) |
| *B29L 31/00* | (2006.01) |

(52) U.S. Cl.
CPC ............... *D01F 9/21* (2013.01); *D01F 9/22* (2013.01); *D02J 1/18* (2013.01); *D02J 1/225* (2013.01); *D02J 13/005* (2013.01); *B29K 2033/08* (2013.01); *B29L 2031/731* (2013.01); *D01D 5/16* (2013.01); *D01F 6/18* (2013.01); *D01F 9/225* (2013.01); *D06B 3/045* (2013.01); *D06C 3/00* (2013.01)

(56) References Cited

FOREIGN PATENT DOCUMENTS

| | | |
|---|---|---|
| JP | 8 246284 | 9/1996 |
| JP | 11 12874 | 1/1999 |
| JP | 11 286845 | 10/1999 |
| JP | 11 350283 | 12/1999 |
| JP | 2002 309438 | 10/2002 |
| JP | 2003 155621 | 5/2003 |
| JP | 2008-214795 A | 9/2008 |
| JP | 2009-174073 A | 8/2009 |
| JP | 2013 159874 | 8/2013 |
| WO | 2012 165574 | 12/2012 |

OTHER PUBLICATIONS

Extended European Search Report dated Jun. 1, 2016 in Patent Application No. 14813113.9.
International Search Report dated Sep. 9, 2014 in PCT/JP14/065995 Filed Jun. 17, 2014.

* cited by examiner

PROCESS FOR STEAM DRAWING CARBON-FIBER PRECURSOR ACRYLIC FIBER BUNDLE

TECHNICAL FIELD

The present invention relates to a process for manufacturing a carbon-fiber precursor acrylic fiber bundle having a pressurized steam drawing step. Further, the invention relates to a pressurized steam drawing apparatus that draws an acrylic fiber bundle using pressurized steam.

BACKGROUND ART

As a method of drawing an acrylic fiber bundle, drawing in a pressurized steam atmosphere is known. This is because temperature higher than hot water in an atmospheric pressure can be obtained and moisture existing therein causes an effect of plasticizing the acrylic fiber bundle so that the fiber bundle can be drawn up to a high magnification. The carbon-fiber precursor acrylic fiber bundle used as a precursor of the carbon fiber particularly does not have a noticeable melting point due to the high acrylonitrile content, and the fiber bundle substantially cannot be drawn only by the effect of the high temperature. For this reason, the pressurized steam drawing process is used in many cases. However, when the acrylic fiber bundle is drawn up to a high magnification by the steam drawing process, problems in which single filaments are broken, fluffs occur, or the entire fiber bundle is broken may occur. The same applies to the cases where a fine fiber is to be obtained or the process is to be performed at a high speed.

CITATION LIST

Patent Document

Patent Document 1: JP 8-246284 A
Patent Document 2: JP 11-012874 A

DISCLOSURE OF THE INVENTION

Problem to be Solved by the Invention

In order to perform the steam drawing process stably, Patent Document 1 discloses a method in which a yarn is made pass through a steam box for preheating the yarn and is introduced into a steam drawing device. Since the fiber bundle is preheated by the steam box, degradation in quality such as fluff can be prevented to a certain degree by using this method even for the carbon-fiber precursor acrylic fiber bundle in which the heat transfer from steam is not easy due to a water-repellent effect caused by silicone-based oil agent applied to the fiber. However, when the carbon-fiber precursor acrylic fiber bundle consisting of the fibers whose surface is smooth and the convergence of the fiber bundle is very good is drawn or a thick bundle having a large total fineness is drawn by this method, troubles in which the inside of the fiber bundle is not uniformly heated by the steam box alone and a breakage of an entire fiber bundle may occur.

Further, in order to stably perform the steam drawing process, Patent Document 2 discloses a method in which an acrylic fiber bundle to be subjected to the steam drawing process is treated with a fluid to be opened before the steam drawing process is performed. The document says that by using this method, a sufficient drawing performance can be obtained even for a carbon-fiber precursor acrylic fiber bundle in which the heat transfer from steam is not easy due to the adhesion between the single filaments in the fiber bundle caused in an oil agent application step and a dry-and-densification step prior to the steam drawing step. Even by this method, however, it is difficult to heat and plasticize the inside of the fiber bundle uniformly, when the process is performed at a high speed or a thick bundle having a large total fineness is processed. Further, the entire acrylic fiber bundle may be broken. Further, even when the entire acrylic fiber bundle breakage is avoided, troubles causing degradation in quality such as the breakage of single filaments or the fluffs cannot be prevented completely.

The present invention is made to solve the problems of the related art, and an objective thereof is to provide a production method and a steam drawing apparatus for an acrylic fiber bundle which can suppress the number of defects to the minimal and enable an excellent process performance, particularly during a high-speed and high-magnification drawing process.

Means for Solving Problem

As a result of a intent study for solving the above-described problems, it was found that the fluff or the breakage of the bundle caused related to the high-speed and high-magnification steam drawing process after applying the silicone-based oil agent was caused by the insufficient heat transfer from the steam and the insufficient plasticizing effect. So by loosening the agglutination of the single filaments with oil agent by an opening process before the acrylic fiber bundle is subjected to the steam drawing process, it is possible to obtain efficient heat transfer from the steam during the steam drawing process. Further, by controlling the temperature of the acrylic fiber bundle to be 80° C. to 130° C. before the acrylic fiber bundle is humidified using the yarn humidifying device, and by introducing the humidified acrylic fiber bundle into the steam drawing apparatus, the more efficient heat transfer by condensation can be obtained. Accordingly, these steps are found to be extremely effective in order to draw the fiber bundle stably at a high speed up to a high magnification. Consequently, the invention is contrived.

According to a first aspect of the present invention, provided is a process for manufacturing a carbon-fiber precursor acrylic fiber bundle, in the process an acrylic fiber bundle is drawn in a pressurized steam atmosphere, comprising the following steps (a), (b) and (c) in this order:
(a) a step of opening the acrylic fiber bundle by spraying a fluid to the acrylic fiber bundle;
(b) a step of applying humidifying steam to the opened acrylic fiber bundle whose temperature has been adjusted to be 80° C. to 130° C., and thus making the moisture content of the acrylic fiber bundle to be 3% to 7%; and
(c) a step of drawing the humidified acrylic fiber bundle in a pressurized steam atmosphere.

As a method of adjusting the temperature of the acrylic fiber bundle guided into the step (b) to be 80° C. to 130° C., preheating the acrylic fiber bundle with a preheating roll or a heating plate is desirable. Further, it is desirable to perform the step (b) by introducing the acrylic fiber bundle into the yarn humidifying device to which the humidifying steam is supplied or spraying the humidifying steam to the acrylic fiber bundle. Further, in the step (b), it is desirable that the humidifying steam supplied to the acrylic fiber bundle be saturated steam.

According to a second aspect of the present invention, provided is a steam drawing apparatus for a carbon-fiber precursor acrylic fiber bundle comprising the following devices disposed in this order: an opening device for opening an acrylic fiber bundle, a yarn humidifying device with a unit for supplying humidifying steam to the acrylic fiber bundle, and a steam drawing device whose internal space is kept in a pressurized state.

It is desirable that a preheating roll or a heating plate with a unit for controlling a surface temperature be disposed between the opening device and the yarn humidifying device in order to preheat the acrylic fiber bundle. Further, it is desirable that the opening device to be disposed between drive rolls capable of controlling the tension of the acrylic fiber bundle. Moreover, it is desirable that the steam drawing device include a labyrinth seal portion provided at each of an entrance and an exit of the steam drawing device through which the acrylic fiber bundle passes.

Effect of the Invention

According to the present invention, the efficient plasticizing effect can be obtained when the steam drawing process is performed on the acrylic fiber bundle, and a trouble involved with the breakage of the entire acrylic fiber bundle can be prevented even when the acrylic fiber bundle is drawn up to a high magnification, even when the process is performed at a high speed, and even when a fine fiber is to be obtained. Further, it is possible to prevent the breakage of a single filament or the fluff and hence to stably obtain a high-quality carbon-fiber precursor acrylic fiber bundle.

MODE(S) FOR CARRYING OUT THE INVENTION

Figure 1:
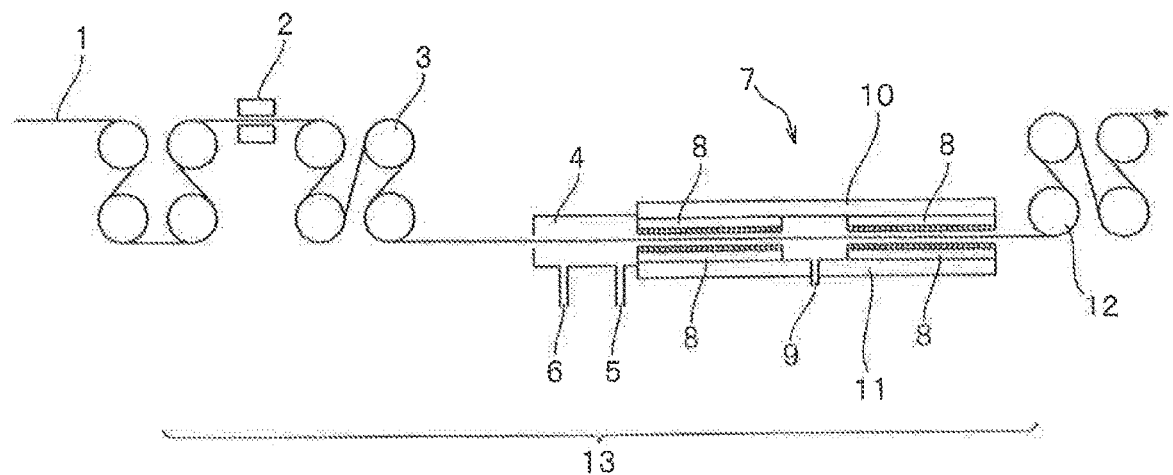
FIG. 1 is a schematic cross-sectional view illustrating a steam drawing apparatus as a representative example of the present invention.

Hereinafter, the present invention will be described in detail. Before and after a pressurized steam drawing process, steps which are known in a fiber production field can be appropriately performed. For example, when an acrylic fiber is spun by a solution spinning method, the acrylic fiber is spun from a solution obtained by dissolving an acrylonitrile copolymer including co-monomer or an acrylonitrile homopolymer as a raw material polymer in an well-known organic or inorganic solvent and is drawn by the steam drawing process of the present invention. In this case, the spinning method may be any one of a wet spinning, a dry/wet spinning, and a dry spinning, and as the subsequent steps, solvent removal, drawing in bath, oil agent application, drying, and the like can be performed. The steam drawing process may be performed in any step of the fiber production. As for the solution spinning, however, it is desirable to perform the steam drawing after a certain degree of solvent is removed from the fiber, that is to say, after the washing or the drawing in bath. Alternatively, it is desirable to perform the steam drawing after the drying. Here, the performing the steam drawing after the drying is more desirable from the viewpoint that a highly-oriented fiber is obtained.

The steam pressure in which the drawing is performed is not particularly limited as long as the pressure is in a pressurized state and the pressure can be appropriately set to a pressure higher than the atmospheric pressure in accordance with the purpose. That is, the steam pressure is appropriately set in accordance with the type of the fiber to be drawn, the process state in the steam drawing step, or the targeted fiber properties.

According to the present invention, it is important that the process for manufacturing a carbon-fiber precursor acrylic fiber bundle in which an acrylic fiber bundle is drawn in a pressurized steam atmosphere has a configuration wherein a fluid is sprayed to the acrylic fiber bundle so as to open the acrylic fiber bundle, humidifying steam is supplied to the acrylic fiber bundle of 80° C. to 130° C. so as to obtain a moisture content of 3% to 7% thereof, and the acrylic fiber bundle is drawn in a pressurized steam atmosphere.

Accordingly, for example, even for the acrylic fiber bundle in which a plasticizing effect of steam is not easily obtained due to a water-repellent effect caused by silicone-based oil agent applied to the fiber, a plasticizing process is uniformly performed even inside the fiber bundle. Accordingly, even when the fiber bundle is drawn up to a high magnification in a steam drawing device, a fine fiber is to be produced, or a drawing speed is high, it is possible to prevent a trouble such as a breakage of the acrylic fiber bundle. Further, it is possible to prevent the breakage of the single filament or the fluff and hence to stably obtain the high-quality carbon-fiber precursor acrylic fiber bundle.

It is desirable to open the acrylic fiber bundle with the opening device while spraying the fluid to the acrylic fiber bundle. The fluid used for opening the fiber bundle may be air, steam, water, organic solvent, or an inorganic or organic solution. Here, any one of these may be used as long as it does not cause a chemical reaction in the acrylic fiber bundle and gives an opening effect. However, air or steam is desirable in consideration of the workability in production. Generally, the opening process is performed by an opening nozzle, but if the traveling acrylic fiber bundle can be opened, the shape is not particularly limited. However, a nozzle capable of spraying a fluid in a direction perpendicular to the traveling acrylic fiber bundle can be desirably used. Further, when the fluid is air or steam, it is desirable that the flow rate be 300 to 700 NL/min and the pressure be about 1 to 5 kgf/cm$^2$. By the opening process, the agglutination of the fibers with oil agent can be loosened. Thus, heat can be efficiently transferred from the steam in the subsequent steam drawing process.

Further, the temperature of the acrylic fiber bundle that receives the humidifying steam after the opening process is desirably 80° C. to 130° C., more desirably 80° C. to 120° C., and further desirably 80° C. to 100° C. Thus, it is desirable to apply the humidifying steam to the acrylic fiber bundle at the temperature.

When the temperature of the acrylic fiber bundle to be humidified is 80° C. to 130° C., the acrylic fiber bundle can efficiently obtain heat by condensation heat transfer caused by the steam.

As for the acrylic fiber bundle, the fiber bundle temperature is high at the drying roll. For this reason, a preheating process is not necessary when the temperature of the acrylic fiber bundle immediately before the humidifying steam is applied thereto is 80° C. to 130° C. However, when the temperature is lower than 80° C., it is desirable to preheat the fiber bundle to 80° C. to 130° C. by using a preheating roll or a heating plate. It is desirable to perform the preheating process between the step (a) and the step (b).

Subsequently, it is desirable to apply the humidifying steam to the fiber bundle immediately before the fiber bundle is introduced into the steam drawing device so that the moisture content of the acrylic fiber bundle is desirably 3% to 7% and more desirably 4% to 6%. When the moisture content is 3% to 7%, the plasticizing effect can be easily obtained. Further, as a method of applying the humidifying steam to the acrylic fiber bundle, it is desirable to use a method of passing the acrylic fiber bundle through the yarn humidifying device into which the humidifying steam is supplied or a method of spraying the humidifying steam to the acrylic fiber bundle. Further, it is desirable that the humidifying steam applied to the acrylic fiber bundle be saturated steam. Since the moisture content of the acrylic fiber bundle introduced into the steam drawing device is controlled, the plasticizing effect in the steam drawing device is more efficiently obtained, and hence the steam drawing process can be performed stably.

Further, it is important that the steam drawing apparatus of the present invention has a configuration in which the opening device for opening the acrylic fiber bundle, the yarn humidifying device having a unit for supplying humidifying steam to the acrylic fiber bundle, and the steam drawing device which keeps an internal space in a pressurized state are disposed.

Further, in order to preheat the acrylic fiber bundle, it is desirable to dispose a preheating roll or a heating plate having a unit for controlling a surface temperature between the opening device and the yarn humidifying device. Further, it is desirable to dispose the opening device between the drive rolls capable of controlling the tension of the acrylic fiber bundle. Further, it is desirable that in the steam drawing device a labyrinth seal portion is provided at each of the entrance and the exit of the drawing device through which the acrylic fiber bundle passes.

By using the steam drawing apparatus, the efficient plasticizing effect is obtained. Even when the fiber bundle is drawn up to a high magnification, a fine fiber is to be obtained, or a drawing speed is high, it is possible to prevent a trouble such as a breakage of the acrylic fiber bundle. Further, it is possible to prevent the breakage of the single filament or the fluff and hence to stably obtain the high-quality carbon-fiber precursor acrylic fiber bundle.

EXAMPLES

Hereinafter, the present invention will be described in more detail by referring to examples. Furthermore, in the example, the evaluation of the breakage of the entire carbon-fiber precursor acrylic fiber bundle was performed in a manner such that the steam drawing process was performed five times and the number of times of the breakage of the entire carbon-fiber precursor acrylic fiber bundle was counted.

Further, the evaluation of the fluff of the carbon-fiber precursor acrylic fiber bundle was performed in a manner such that the traveling carbon-fiber precursor acrylic fiber bundle was observed by eyes for three minutes and the number of fluffs of the surface of the carbon-fiber precursor acrylic fiber bundle was counted. The breakage draw ratio was obtained by the following equation.

Winding Roll Speed (m/min)/Drawing Roll Speed (m/min)=Breakage Draw Ratio

Example 1

Acrylic copolymer including acrylonitrile of 98 mol % and methacrylic acid of 2 mol % was dissolved into dimethylformamide so as to prepare a spinning dope of a polymer concentration of 23%. The spinning dope was ejected from a spinning nozzle into a coagulating bath at a temperature of 10° C. and a concentration of 80% so as to obtain a coagulated yarn. The coagulated yarn was drawn in cold water and then drawn in hot water, and was subjected to an oil agent application and a dry densification process so as to obtain an acrylic fiber bundle. Subsequently, the acrylic fiber bundle was drawn 4.0 times using a steam drawing apparatus 13 shown in FIG. 1 so as to obtain a carbon-fiber precursor acrylic fiber bundle in which the single filament fineness was 1.0 decitex and the number of filaments was 12000.

In the steam drawing apparatus 13 shown in FIG. 1, the acrylic fiber bundle (the yarn) 1 is guided to the opening device 2 by a plurality of rolls. In the opening device 2, the fiber bundle is opened by the air blown in a direction perpendicular to the traveling acrylic fiber bundle 1 at the flow rate of 300 to 700 NL/min further desirably 400 to 500 NL/min.

The acrylic fiber bundle 1 which is opened using the opening device 2 is preheated by the preheating roll 3, and is humidified with the yarn humidifying device 4 having a unit for supplying saturated steam.

The acrylic fiber bundle 1 is preheated to 81° C. by the preheating roll 3, and is supplied to the yarn humidifying device 4.

The saturated steam is supplied to the yarn humidifying device 4 through the steam supply pipe 5 and the condensed water is discharged from a drainage discharge port 6. The moisture content of the acrylic fiber bundle 1 is adjusted with the yarn humidifying device 4 to be 5.4%, and the acrylic fiber bundle 1 is supplied from the yarn humidifying device 4 to the steam drawing device 7.

The steam drawing device 7 is formed so that the upper portion is covered by an upper lid 10 and the lower portion is covered by a stand 11, and the pressurized steam is supplied through a steam inlet 9. A labyrinth seal portion 8 is provided at each of the entrance and the exit of the acrylic fiber bundle 1, and the steam pressure inside the steam drawing device 7 is pressurized at 400 KPa. The carbon-fiber precursor acrylic fiber bundle is supplied from the steam drawing device 7 to a winding roll 12.

A result for the evaluation of the number of times of breakage, the number of fluffs, and the breakage draw ratio of the obtained carbon-fiber precursor acrylic fiber bundle is shown in Table 1.

TABLE 1

| No. | Opening device | Preheating roll | Yarn humidifying device | Steam drawing device | Treatment order ① is in upstream of process | | | | | Temperature of fiber immediately before yarn humidifying device (° C.) | Moisture content of fiber after yarn humidifying device (%) | Number of times of cutting acrylic fiber bundle | Fluff (number/ 3 min) | Breakage Draw Ratio | Figure |
|---|---|---|---|---|---|---|---|---|---|---|---|---|---|---|---|
| Example 1 | Provided | Provided | Provided | Provided | ① Opening device | ② Preheating roll | ③ Yarn humidifying device | ④ Steam drawing machine | | 81 | 5.4 | 0 | 0 | 8.0 | 1 |
| Example 2 | Provided | Provided | Provided | Provided | ① Opening device | ② Preheating roll | ③ Yarn humidifying device | ④ Steam drawing machine | | 102 | 5.1 | 0 | 0 | 7.6 | 1 |
| Example 3 | Provided | Provided | Provided | Provided | ① Opening device | ② Preheating roll | ③ Yarn humidifying device | ④ Steam drawing machine | | 129 | 5.2 | 0 | 0 | 7.0 | 1 |
| Example 4 | Provided | Provided | Provided | Provided | ① Opening device | ② Preheating roll | ③ Yarn humidifying device | ④ Steam drawing machine | | 103 | 3.4 | 0 | 0 | 7.5 | 1 |
| Example 5 | Provided | Provided | Provided | Provided | ① Opening device | ② Preheating roll | ③ Yarn humidifying device | ④ Steam drawing machine | | 101 | 7.1 | 0 | 0 | 7.4 | 1 |
| Comparative Example 1 | Not provided | Not provided (used as feeding roll) | Not provided | Provided | ① Steam drawing machine | — | ③ | ④ | | 27 | — | 5 | 21 | 4.0 | 2 |
| Comparative Example 2 | Not provided | Not provided (used as feeding roll) | Provided | Provided | ① Yarn humidifying device | — | ③ | ④ | | 27 | 5.7 | 1 | 15 | 4.2 | 3 |
| Comparative Example 3 | Not provided | Provided | Provided | Provided | ① Preheating roll | ② Yarn humidifying device | ③ Steam drawing machine | ④ | | 101 | 5.2 | 1 | 10 | 4.5 | 4 |
| Comparative Example 4 | Provided | Provided | Not provided | Provided | ① Opening device | ② Preheating roll | ③ Steam drawing machine | ④ | | 103 | — | 2 | 9 | 4.3 | 5 |
| Comparative Example 5 | Provided | Provided | Provided | Provided | ① Preheating roll | ② Opening device | ③ Yarn humidifying device | ④ Steam drawing machine | | 101 | 5.1 | 1 | 5 | 4.6 | 6 |
| Comparative Example 6 | Provided | Provided | Provided | Provided | ① Preheating roll | ② Yarn humidifying device | ③ Opening device | ④ Steam drawing machine | | 101 | 4.9 | 3 | 14 | 4.0 | 7 |
| Comparative Example 7 | Provided | Provided | Provided | Provided | ① Yarn humidifying device | ② Preheating roll | ③ Opening device | ④ Steam drawing machine | | 102 | 4.7 | 4 | 18 | 4.0 | 8 |

※Values in "Temperature of fiber immediately before yarn humidifying device" of Comparative Examples 1, 4, and 7 are temperatures of fibers immediately before the steam drawing device.

Examples 2 to 5

As shown in Table 1, the carbon-fiber precursor acrylic fiber bundle was obtained similarly to Example 1 except that the process condition of the steam drawing apparatus 13 was changed. A result for the evaluation of the number of times of breakage, the number of fluffs, and the breakage draw ratio of the obtained carbon-fiber precursor acrylic fiber bundle is shown in Table 1.

Comparative Example 1

Figure 2:
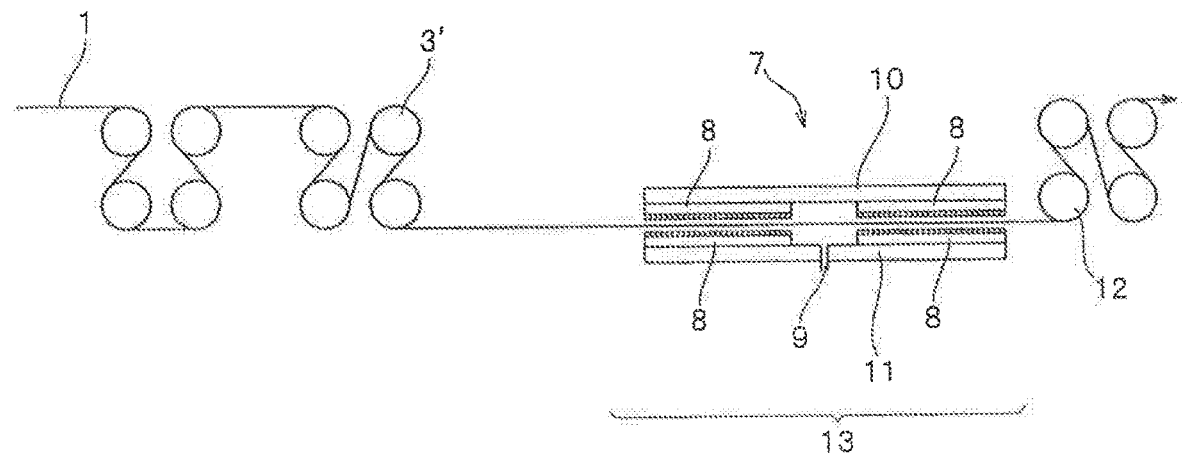
FIG. 2 is a schematic cross-sectional view illustrating a steam drawing apparatus as a comparative example including a steam drawing device alone.

As shown in FIG. 2, the carbon-fiber precursor acrylic fiber bundle was obtained similarly to Example 1 except that a device other than the steam drawing device 7 was not provided. Furthermore, Reference Numeral 3' indicates a non-preheating feeding roll. A result for the evaluation of the number of times of breakage, the number of fluffs, and the breakage draw ratio of the obtained carbon-fiber precursor acrylic fiber bundle is shown in Table 1.

Comparative Example 2

Figure 3:
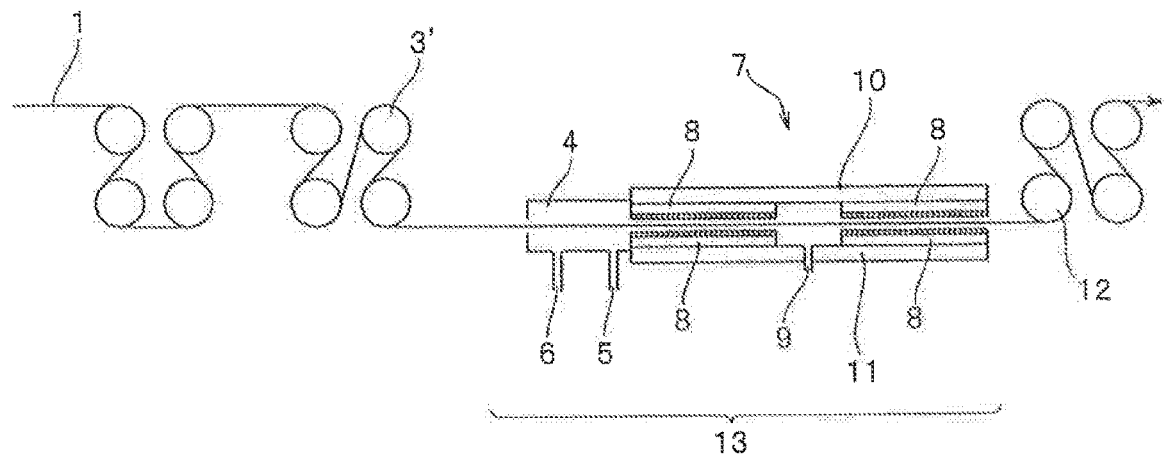
FIG. 3 is a schematic cross-sectional view illustrating a steam drawing apparatus as a comparative example without an opening device and a preheating device.

As shown in FIG. 3, the carbon-fiber precursor acrylic fiber bundle was obtained similarly to Example 1 except that the opening device 2 and the preheating roll 3 were not provided. Furthermore, Reference Numeral 3' indicates a non-preheating feeding roll. A result for the evaluation of the number of times of breakage, the number of fluffs, and the breakage draw ratio of the obtained carbon-fiber precursor acrylic fiber bundle is shown in Table 1.

Comparative Example 3

Figure 4:
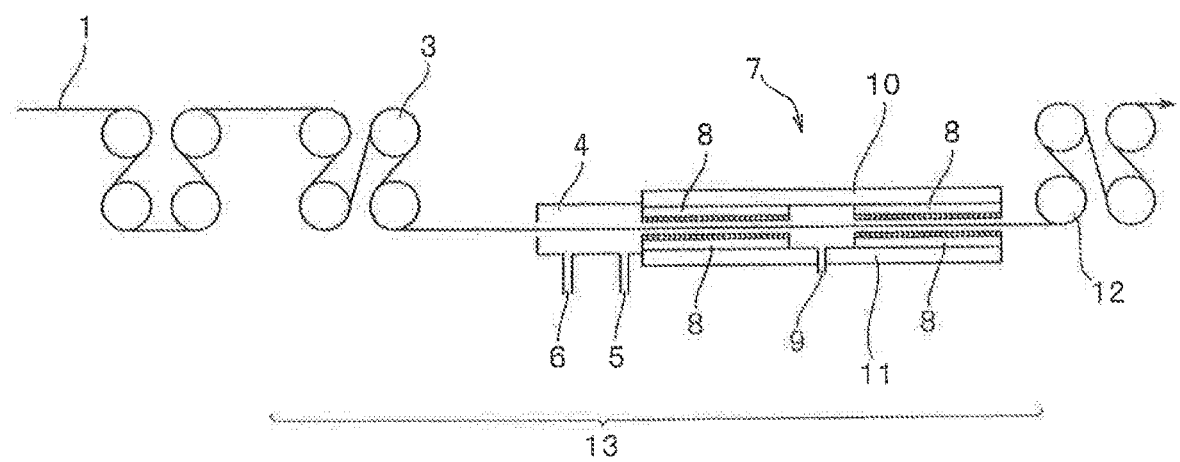
FIG. 4 is a schematic cross-sectional view illustrating a steam drawing apparatus as a comparative example without an opening device.

As shown in FIG. 4, the carbon-fiber precursor acrylic fiber bundle was obtained similarly to Example 1 except that the opening device 2 was not provided. A result for the evaluation of the number of times of breakage, the number of fluffs, and the breakage draw ratio of the obtained carbon-fiber precursor acrylic fiber bundle is shown in Table 1.

Comparative Example 4

Figure 5:
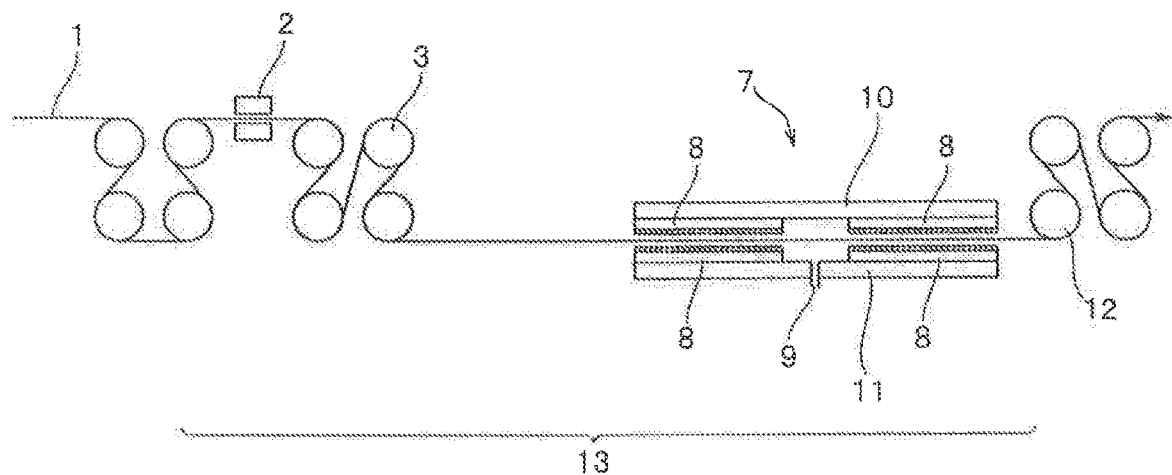
FIG. 5 is a schematic cross-sectional view illustrating a steam drawing apparatus as a comparative example without a yarn humidifying device.

As shown in FIG. 5, the carbon-fiber precursor acrylic fiber bundle was obtained similarly to Example 1 except that the yarn humidifying device 4 was not provided. A result for the evaluation of the number of times of breakage, the number of fluffs, and the breakage draw ratio of the obtained carbon-fiber precursor acrylic fiber bundle is shown in Table 1.

Comparative Examples 5 to 7

Figure 6:
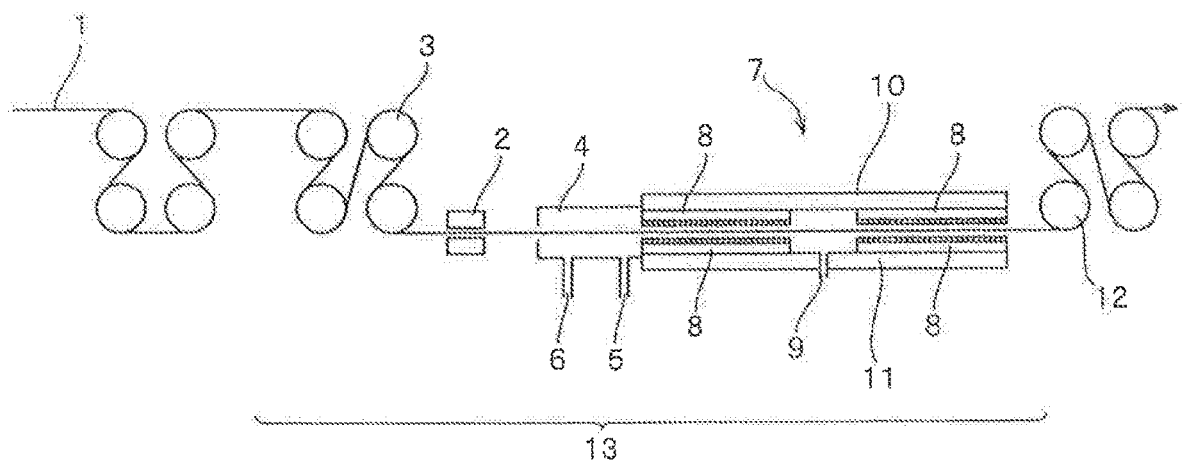
FIG. 6 is a schematic cross-sectional view illustrating a steam drawing apparatus as a comparative example in which a preheating roll, an opening device, and a yarn humidifying device are disposed in this order.
Figure 7:
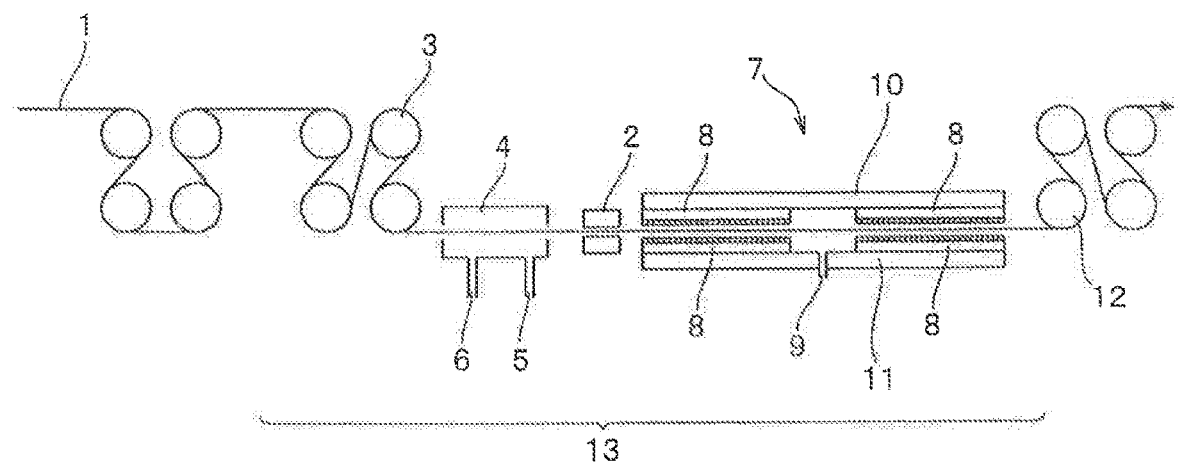
FIG. 7 is a schematic cross-sectional view illustrating a steam drawing apparatus as a comparative example in which a preheating roll, a yarn humidifying device, and an opening device are disposed in this order.
Figure 8:
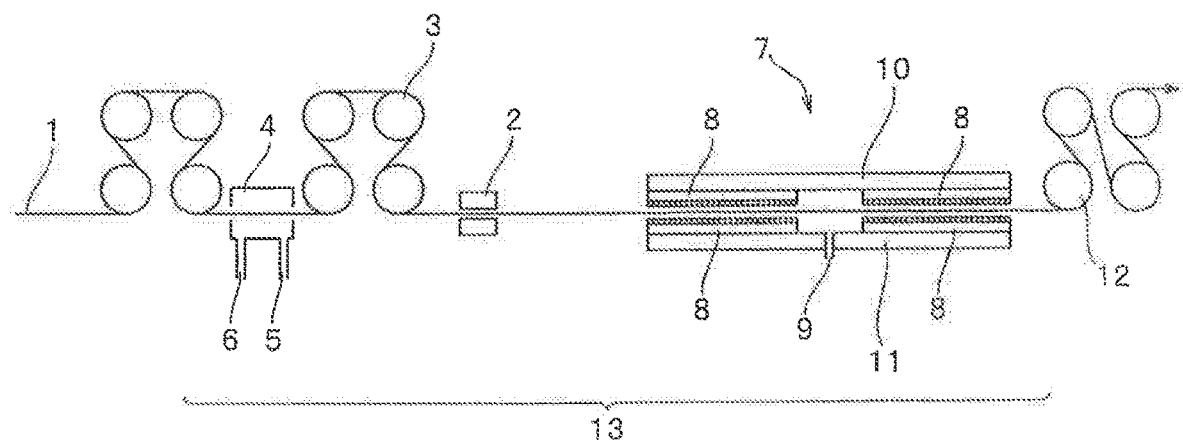
FIG. 8 is a schematic cross-sectional view illustrating a steam drawing apparatus as a comparative example in which a yarn humidifying device, a preheating roll, and an opening device are disposed in this order.

As shown in FIGS. 6 to 8, the carbon-fiber precursor acrylic fiber bundle was obtained similarly to Example 1 except that the installation positions of the opening device 2, the preheating roll 3, and the yarn humidifying device 4 were changed. A result for the evaluation of the number of times of breakage, the number of fluffs, and the breakage draw ratio of the obtained carbon-fiber precursor acrylic fiber bundle is shown in Table 1.

EXPLANATIONS OF LETTERS OR NUMERALS

1: acrylic fiber bundle (yarn)
2: opening device
3: preheating roll
3': non-preheating feeding roll
4: yarn humidifying device
5: steam supply pipe
6: drainage discharge port
7: steam drawing device
8: labyrinth seal portion
9: steam inlet
10: upper lid
11: stand
12: winding roll
13: steam drawing apparatus

The invention claimed is:

1. A process for manufacturing a carbon-fiber precursor acrylic fiber bundle, comprising:
    drawing an acrylic fiber bundle in a pressurized steam atmosphere, and in the following order:
    opening the acrylic fiber bundle by spraying a fluid to the acrylic fiber bundle;
    preheating the opened acrylic fiber bundle to 80° C. to 130° C.;
    supplying a humidifying steam to the preheated acrylic fiber bundle thereby making the moisture content of the acrylic fiber bundle to be 3% to 7%; and
    drawing the humidified acrylic fiber bundle in a pressurized steam atmosphere.

2. The process according to claim 1, wherein the preheating is performed with a preheating roll or a heating plate.

3. The process according to claim 1, wherein the humidifying steam is supplied to the preheated acrylic fiber bundle by introducing the preheated acrylic fiber bundle into a yarn humidifying device to which the humidifying steam is supplied.

4. The process according to claim 1, wherein the humidifying steam is supplied to the preheated acrylic fiber bundle by spraying the humidifying steam to the preheated acrylic fiber bundle.

5. The process according to claim 1, wherein the humidifying steam supplied to the preheated acrylic fiber bundle is a saturated steam.

6. The process according to claim 1, comprising preheating the opened acrylic fiber bundle to 80° C. to 120° C.

7. The process according to claim 6, wherein the moisture content of the acrylic fiber bundle is made to be 4% to 6%.

8. The process according to claim 1, comprising preheating the opened acrylic fiber bundle to 80° C. to 100° C.

9. The process according to claim 8, wherein the moisture content of the acrylic fiber bundle is made to be 4% to 6%.

10. The process according to claim 9, comprising opening the acrylic fiber bundle by spraying air or steam to the acrylic fiber bundle at a flow rate of 300 to 700 NL/min and a pressure of 1 to 5 kgf/cm$^2$.

11. The process according to claim 1, wherein the moisture content of the acrylic fiber bundle is made to be 4% to 6%.

12. The process according to claim 1, comprising opening the acrylic fiber bundle by spraying air or steam to the acrylic fiber bundle at a flow rate of 300 to 700 NL/min and a pressure of 1 to 5 kgf/cm$^2$.

* * * * *